United States Patent

Tazine et al.

Patent Number: 5,877,822
Date of Patent: Mar. 2, 1999

[54] METHOD FOR STORING DIGITAL CHANNEL TUNING DATA, AND CIRCUIT, TELEVISION RECEIVER AND VIDEO CASSETTE RECORDER IMPLEMENTING THE METHOD

[75] Inventors: Nour-Eddine Tazine, Noyal sur Vilaine; Jino Nguyen, Betton; Yves Maetz, Rennes, all of France

[73] Assignee: Thomson Multimedia S.A., Courbevoie, France

[21] Appl. No.: 659,106

[22] Filed: Jun. 3, 1996

[30] Foreign Application Priority Data

Jun. 12, 1995 [FR] France .................................. 95 06905

[51] Int. Cl.⁶ ..................................................... H04N 5/50
[52] U.S. Cl. ........................... 348/731; 348/732; 348/553
[58] Field of Search ..................................... 348/731, 732, 348/734, 729, 553, 555, 558, 485, 735; 455/185.1, 186.1, 186.2; H04N 5/46, 5/50

[56] References Cited

U.S. PATENT DOCUMENTS

| | | | |
|---|---|---|---|
| 4,959,720 | 9/1990 | Duffield et al. | 348/731 |
| 5,083,205 | 1/1992 | Arai | 348/555 |
| 5,087,977 | 2/1992 | Suizu | 358/193 |
| 5,355,162 | 10/1994 | Yazolino et al. | 348/555 |
| 5,371,550 | 12/1994 | Shibutani et al. | 348/570 |
| 5,428,405 | 6/1995 | Lee | 348/731 |
| 5,442,452 | 8/1995 | Ryu | 348/734 |

FOREIGN PATENT DOCUMENTS

| | | | |
|---|---|---|---|
| 0453937 | 10/1991 | European Pat. Off. | H04N 5/50 |
| 0512618 | 11/1992 | European Pat. Off. | H04N 5/50 |
| 0529340 | 3/1993 | European Pat. Off. | H04N 5/44 |
| 2592543 | 7/1987 | France | H04N 5/46 |
| 2602930 | 2/1988 | France | H03J 1/22 |
| 3037196 | 2/1982 | Germany | H04N 9/42 |
| 2256333 | 12/1992 | United Kingdom | H04N 5/782 |

OTHER PUBLICATIONS

Copy of Search Report

*Primary Examiner*—Sherrie Hsia
*Attorney, Agent, or Firm*—Joseph S. Tripoli; Peter M. Emanuel; Paul P. Kiel

[57] ABSTRACT

The disclosure relates to a method and a circuit for storage of digital tuning data and parameters for a number of television channels in a rewritable memory. The channel search is initialized by pressing a single button to initialize a scan of the reception frequency band. The scanning of the frequency range is interrupted for a preset time-out period $\Delta t$ each time a stop-scan signal is generated and resumes automatically until the entire range has been scanned. After each stop-scan pulse, if the single button is pressed during a time-out period, $\Delta t$, the system begins toggling through the possible values of each parameter relating to the station, the current value of the parameter being memorized when the single button is pressed again. The invention also includes a television and video cassette recorder implementing the above method.

6 Claims, 2 Drawing Sheets

METHOD FOR STORING DIGITAL CHANNEL TUNING DATA, AND CIRCUIT, TELEVISION RECEIVER AND VIDEO CASSETTE RECORDER IMPLEMENTING THE METHOD

BACKGROUND OF THE INVENTION

The present invention relates to a method for storing digital channel tuning data. It is applicable in the field of television receivers and video cassette recorders.

DESCRIPTION OF THE PRIOR ART

It is usual for such devices to memorize parameters relative to a number of television channels. In the past, data were stored by mechanical means that were not easily intelligible to non-professional users. In the current state of the technology, channel memorization requires successive scans of the entire frequency range. The first scan searches for the first value of a first parameter (PAL for instance) followed by a second scan of the frequency range for another value of the same parameter and so on. Each time a channel is tuned in, the user is prompted for some additional action to memorize the data relative to the channel.

This method is slow, and there is also a potential for error, which imposes a complete reset of the memory.

SUMMARY OF THE INVENTION

The object of the present invention is to overcome the drawbacks of current systems by offering a method that is much simpler to use and that provides more reliable channel memorization.

For this purpose, the invention describes a method of storing digital tuning data and parameters for a number of channels in a rewritable memory for purposes of tuning television receivers and video cassette recorders, the time the scanning is paused, it said single button is pressed during a time-out period, $\Delta t$, the system records the reception frequency of the detected channel in an unoccupied location of said rewritable memory then, for each of the parameters defining a channel, begins toggling through the possible parameter values until said single button is pressed to memorize the current parameter value in the same memory location as said reception frequency, said frequency scan being automatically resumed if said single button is not pressed during said timeout period, $\Delta t$, after pausing of the scanning.

Advantageously, pressing said single button to validate the value of the last parameter for a given frequency causes validation of all the parameter values memorized for the corresponding station.

In the first variant of the system, said channel parameter values are memorized in memory locations that are incremented automatically for each new channel.

In the second variant, said channel parameter values are memorized in memory locations selected using program selection keys.

The invention also relates to a circuit for selection of channel data in a rewritable memory, used for tuning of television receivers or video cassette recorders, in which the memory locations can be accessed by program selection keys, wherein the system uses a single button to initiate the memorization of parameters for viewable channels and to assign parameter values to each selected reception frequency.

The invention also relates to a television receiver and video cassette recorder equipped with said channel data selection circuit.

BRIEF DESCRIPTION OF THE DRAWINGS

The invention will be better understood and other advantages and characteristics will become dear on reading the following description, making reference to the appended figures, of which.

The programming of the receiver using the method according to the invention is as follows:

The programming sequence is initiated by pressing the single button provided for the entire memorization process.

The receiver includes a known multi-standard demodulator using a phase comparator receiving a signal from a voltage-controlled oscillator (VCO).

Figure 1:
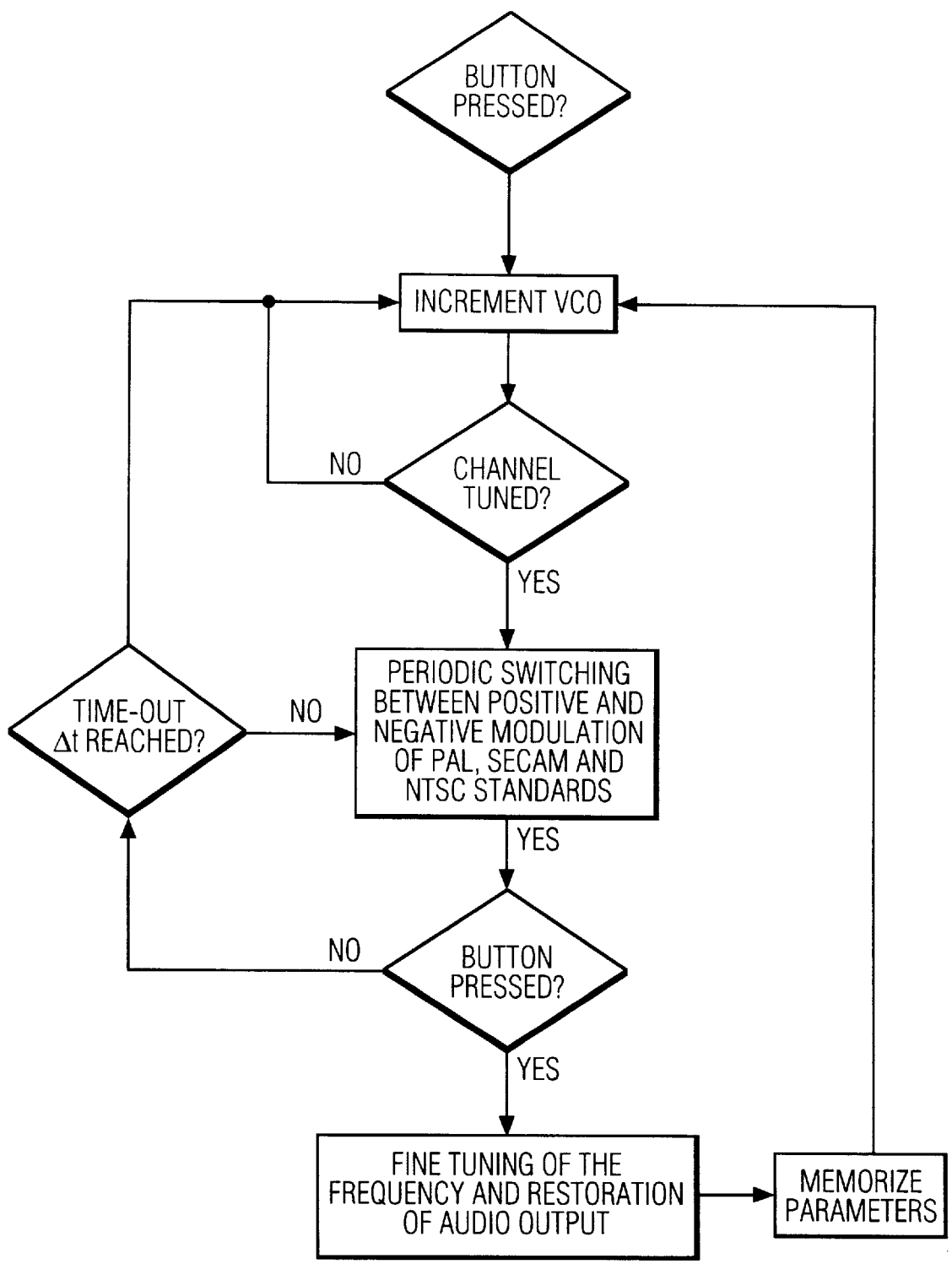
FIG. 1 shows the process flow chart of the method according to the invention.
Figure 2:
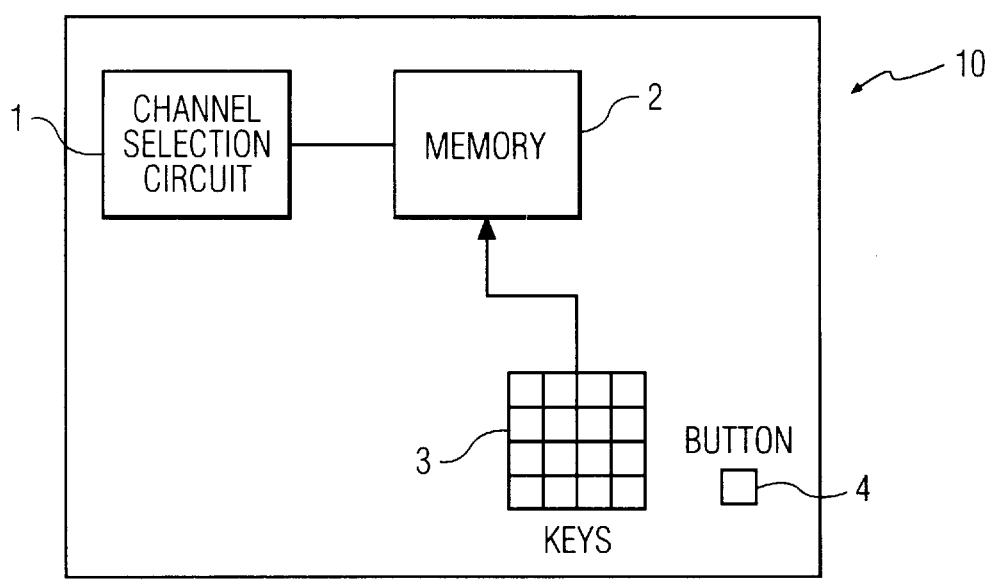
FIG. 2 shows a television receiver according to the invention.

The television receiver 10 of FIG. 2 comprises a channel selection circuit 1, a rewritable memory 2, program selection keys 3 and a button 4.

The control voltage for the oscillator varies continuously until a transmission is detected. Detection of a reception signal from a transmitter activates periodic changes in modulation (positive and negative) and the different possible television standards (NTSC, PAL or SECAM) in the form of successive changes associating both polarities (positive and negative) to each standard. The user typically presses the single button 4 when a clear picture is visible on the screen. This sets the modulation to the appropriate standard for the channel being selected. If the single button is not pressed after a delay, $\Delta t$, corresponding to several nodulation change cycles, the frequency scan resumes automatically.

When the appropriate modulation has been selected, the system will propose the different possible standards (NTSC, PAL or SECAM) in succession until the single button 4 is pressed when a clear picture is visible on the screen. If the single button 4 is not pressed after a delay $\Delta t$ corresponding to several changes of standard, the frequency scan resumes automatically.

Channel selection continues by adjustment of the frequency and restoration of the audio portion which is cut out during the scanning phase. Channels selected are registered in empty memory locations. This is done either automatically or by selecting a channel number using the channel selector 3.

The selection cycle continues automatically until all the memory locations are full, or the entire frequency range has been scanned, or the user intentionally interrupts the selection process.

The description of the present invention provided above is not restrictive. It is obvious that a professional of the art will be able to develop variants of the invention which will be within the scope of the invention.

What is claimed is:

1. Method for storing digital tuning data for television channels in a rewritable memory, said method comprising the steps of:
   a. initiating an automatic channel search by starting a scan of a reception frequency band,
   b. upon detection of a channel, pausing the scan at a current reception frequency and carrying out steps c) to e) for at least one channel parameter,
   c. periodically cycling through possible values of said parameter for a given time period or until a button is pressed, d. resuming said scan and returning to step b) if said button is not pressed during said given time period, e. storing the current value of the parameter with the current reception frequency if said button is pressed during said given time period, and f. resuming the scan of the frequency band and returning to step b).

2. Method according to claim 1, wherein pressing said button during said cycling of said parameter values for a last parameter for a channel validates all stored parameter values for said channel.

3. Method according to claim 1, wherein parameter values for a channel are stored in memory locations of said rewritable memory which are incremented automatically for each new channel.

4. Method according to claim 1, wherein parameter values for a channel are stored in memory locations which are selected using channel selection keys.

5. Method according to claim 1, wherein a same button is used for starting said scan and in steps c to e to assign a parameter value.

6. Television receiver including a rewritable memory for storing tuning data and a circuit for selecting tuning data from said rewritable memory, wherein a single button is used for initiating an automatic channel search by starting a scan of a reception frequency band and for manually triggering the storing of a current value at a channel parameter in said rewritable memory during a periodic cycling though possible values of said parameter.

* * * * *